(12) United States Patent
Aita et al.

(10) Patent No.: US 9,816,017 B2
(45) Date of Patent: Nov. 14, 2017

(54) ANAEROBIC CURING FORMULATIONS FOR SEALING AND BLOCKING BOLTS AND NUTS

(75) Inventors: Gaspare Aita, Settimo Milanese (IT); Antonio Calasso, Jr., Pozzuolo Martesana (IT)

(73) Assignee: TECNOLOGIC 3 S.R.L., Gorgonzola (MI) (IT)

( * ) Notice: Subject to any disclaimer, the term of this patent is extended or adjusted under 35 U.S.C. 154(b) by 329 days.

(21) Appl. No.: 14/400,718

(22) PCT Filed: May 18, 2012

(86) PCT No.: PCT/IB2012/000968
§ 371 (c)(1),
(2), (4) Date: Jan. 23, 2015

(87) PCT Pub. No.: WO2013/171528
PCT Pub. Date: Nov. 21, 2013

(65) Prior Publication Data
US 2015/0133591 A1 May 14, 2015

(51) Int. Cl.
C09J 4/06 (2006.01)
C09J 133/08 (2006.01)
C08K 5/41 (2006.01)

(52) U.S. Cl.
CPC .............. *C09J 133/08* (2013.01); *C08K 5/41* (2013.01); *C09J 4/06* (2013.01)

(58) Field of Classification Search
CPC .............. C08K 5/41; C09J 4/06; C09J 133/08

USPC ................... 523/176; 264/4.33; 524/156, 533
See application file for complete search history.

(56) References Cited

U.S. PATENT DOCUMENTS

| | | |
|---|---|---|
| 3,855,040 A | 12/1974 | Malofsky |
| 3,970,505 A | 7/1976 | Hauser et al. |
| 4,007,322 A | 2/1977 | House |
| 4,048,259 A | 9/1977 | Wegemund et al. |
| 4,410,644 A | 10/1983 | Bunyan |
| 4,417,028 A | 11/1983 | Azevedo |
| 4,546,125 A | 10/1985 | Okamoto et al. |
| 2008/0242764 A1 | 10/2008 | Wallace |
| 2008/0277060 A1 | 11/2008 | Malofsky |

FOREIGN PATENT DOCUMENTS

| | | |
|---|---|---|
| CN | 102115640 A | 7/2011 |
| WO | 0001767 | 1/2000 |
| WO | 2011047738 | 4/2011 |

OTHER PUBLICATIONS

International Search Report issued in PCT Application No. PCT/IB2012/000968.

*Primary Examiner* — Edward Cain
(74) *Attorney, Agent, or Firm* — Lucas & Mercanti, LLP

(57) ABSTRACT

Anaerobic curing formulations for sealing and/or blocking screws, nuts, bolts and screw or sealing caps are described. The sealing formulation comprises at least one acrylic resin and phenoxy-polyethoxy sulphate. The self-locking formulation comprises at least one diacrylate, an acrylic resin, a microencapsulated polymerisation initiator and a microencapsulated polymerisation accelerator. A method is described for coating a polymerization accelerator to obtain a microencapsulated polymerisation accelerator.

16 Claims, 4 Drawing Sheets

ANAEROBIC CURING FORMULATIONS FOR SEALING AND BLOCKING BOLTS AND NUTS

CROSS-REFERENCE TO RELATED APPLICATIONS

This application is a 371 of PCT/IB2012/000968, filed May 18, 2012, which claims the contents of which are incorporated herein by reference.

FIELD OF THE INVENTION

The present invention concerns anaerobic curing/cross-linkable formulations based on acrylic resins in aqueous emulsions. On the basis of the composition of these formulations it is possible to modulate the characteristics of their reaction products to make them suitable in particular for use as sealing and/or blocking agents for the connections of screws, nuts, bolts and screw or sealing caps.

STATE OF THE ART

Various formulations are commercially available suitable for use for sealing and blocking nuts and bolts. Some of these known patent publications are briefly discussed below.

The international patent application WO 00/01767 concerns a composition for sealing and self-locking a nut on a screw. The composition is an emulsion or aqueous dispersion of:
a) at least one polymerizable (meth)acrylic monomer, present in a quantity of 4%-15% by weight of the total composition,
b) a binding agent soluble or dispersible in water (a reactive monomer) and
c) a free radical polymerization initiator in the form of a microcapsule (benzoyl peroxide) in an effective quantity.

The addition of polymerization inhibitors such as hydroquinones gives stability to the polymeric composition. A polymerization accelerator can be added to the composition, for example organometallic compounds, which contain a fraction of ferrocene. The pH is controlled by the addition of a basic solution. The composition shows a high resistance to ageing caused by heat and is very stable on copper and bronze surfaces.

The U.S. Pat. No. 4,417,028 describes an adhesive coating composition comprising a polymerizable monomer, a binding system and a polymerization initiator and accelerator (ferrocene). The polymerizable monomer used in the composition is described as a mixture of poly- and mono-functional esters of acrylic acid (they include urethane acrylates; hydroxypropyl methacrylate; hydroxyethyl methacrylate). The binding system comprises a copolymer of an anhydride and a compound selected from arylene, alkylene, alkoxylene, arylalkylene etc. The preferred binding agent is ethylene/maleic anhydride. These binding agents form a stable suspension or dispersion and also contribute to adhesion of the film pre-applied on a substrate by means of hydrolysis of the anhydride ring. Bases ($NH_4OH$, $NaOH$) are used to control the pH of the composition in order to obtain optimal adhesion of the composition pre-applied to the substrate. The composition has a long shelf life, improved resistance to thermal ageing and greater self-locking between the bolt and the screw.

The U.S. Pat. No. 4,546,125 concerns an adhesive curing composition having improved strength and adhesion speed. The composition comprises anaerobically polymerizable monomers containing at least 10% by weight of an anaerobically polymerizable monomer capable of dissolving more than 0.5% by weight of water; o-benzoic sulfonamide (polymerization accelerator); heterocyclic tertiary amine and/or aromatic amine to improve thermal resistance; radical polymerization initiator and water. Urethane poly(meth)acrylate is described as the polymerizable monomer.

U.S. Pat. No. 4,048,259 describes an adhesive sealing composition, which hardens in anaerobic conditions. The composition comprises a polymerizable acrylic ester, a peroxidic polymerization initiator and an ester of acrylic acid. The composition can contain stabilizers (hydroquinone), accelerators (aliphatic or aromatic quaternary amines), thickeners, dyes and fillers ($CaCO_3$, $TiO_2$ and soluble dyes). Thickeners that can be used in the composition are poly(alkyl)acrylates and methacrylates. The composition is a non-corrosive adhesive mixture and produces a very strong fixing.

U.S. Pat. No. 4,007,322 describes anaerobic sealing compositions comprising one or more non-oxygenated acrylic monomers, a polymerization initiator (organic peroxide), a polymerization inhibitor (hydroquinone) and a polymerization accelerator (benzoic sulfonamide). The polymerization inhibitor gives the composition a long shelf life in the event of contact with the air. If none of the surfaces is metal, at least one of the contacting surfaces must be pre-treated with a primer.

U.S. Pat. No. 3,855,040 concerns anaerobic compositions which polymerize quickly and contain monomers of acrylic acid ester, polymerization initiator (organic peroxide), a strong acid and an activator (containing a fraction of ferrocene). The activator is selected to control the curing speed.

U.S. Pat. No. 3,970,505 describes anaerobic compositions containing polyfunctional monomers of acrylic acid ester, peroxidic polymerization initiator, substituted thiourea and an acid substance. The composition cures quickly, at the same time maintaining good mechanical properties such as solidity, flexibility and sealing property. The monomers used produce adhesive characteristics and long-lasting sealants. Examples of polyacrylic esters are: di- and tetraethylene glycol dimethacrylate, butylene glycol dimethacrylate, diglycerol diacrylate, etc.

U.S. Pat. No. 4,410,644 describes an anaerobic sealing composition comprising a polymerizable acrylic acid ester monomer, a polymerization initiator (hydroperoxide), a polymerization inhibitor (quinone), an accelerator of organic sulfonamide type, a thickener (polyglycols), a colouring agent, a viscosity control agent (=rheology modifier) such as silica fume; an anti-wear agent [(against metal wear caused by friction between the metal contacting parts), i.e. an anti-galling agent, such as tetrafluoroethylene] and at least one plasticizer (glycerides).

All these known formulations are based on (meth)acrylate compounds in combination with different types of additives, polymerization initiators and accelerators to obtain cured reaction products with the desired physical, mechanical and chemical characteristics. Nevertheless, there is the need for anaerobic curing/crosslinkable formulations which are able to satisfy applications requiring a wide curing strength range without the use of primers and polymerization inhibitors, and which have physical, mechanical and chemical characteristics superior to those of the known art.

SUMMARY OF THE INVENTION

The present invention provides anaerobic polymerizable and curing/crosslinkable formulations in aqueous emulsion, which cure/crosslink in a relatively short time, and their reaction products which exhibit an improved blocking force (expressed by improved detachment), improved resistance to oil and high resistance to heat.

The formulations of the present invention are in paste form and can be easily applied to the threads of screws and bolts to guarantee a sealing and blocking effect; they do not require the use of primer and polymerization inhibitors.

One aspect of the present invention includes a new formulation which is polymerizable and curable in anaerobic conditions and which is particularly useful in application on screw and bolt threads to produce improved sealing force with respect to the results that can be obtained using the products of the known art. Said formulation comprises at least one acrylic resin and phenoxy-polyethoxy sulphate in combination with other additives commonly used in the known art. This formulation is called below, according to the present invention, "sealing formulation".

Another aspect of the present invention includes a new formulation which is polymerizable and curable in anaerobic conditions and which is particularly useful in application on screw and bolt threads to produce improved blocking forces with respect to the results that can be obtained using the products according to the known art. Said formulation comprises at least one dimethacrylate, an acrylic resin, a polymerization and curing initiator, an accelerator and other additives commonly used in the known art. Both the initiator and the accelerator are used in microencapsulated form. This formulation is called, according to the invention, "self-locking formulation".

The reaction products of these formulations are able to perform the required bolt sealing and blocking action which can be more or less intense and more or less rapid according to the type of application for which they are intended.

The formulations are deposited inside the screw threads by means of equipment known in the prior art and subsequently oven-dried, during which the nut is tightened and the polymerization is triggered thus giving rise to reaction products that produce the above results.

The reaction products of these formulations are characterised by an excellent resistance to vibration, heat and aggressive chemicals. They are used above all for sealing and blocking the threads of screws and mechanical devices, preventing loosening and leakage.

DETAILED DISCLOSURE OF THE INVENTION

The sealing formulation contains 4-8% by weight of acrylic resin and 40-70% by weight of phenoxy-polyethoxy sulphate. The phenoxy-polyethoxy sulphate preferably used according to the present invention is an aqueous mixture of nonylphenoxy polyethoxy branched ammonium sulphate at a concentration of between 40 and 45% and an aqueous solution of ammonia 0.1-0.2%.

The sealing formulation contains water in a quantity of between 20 and 35% by weight. It is possible to add other additives to the sealing formulation, for example plasticizers, dyes, fillers, corrosion inhibitors, etc.

The following is an example of a sealing formulation according to the present invention:

| | |
|---|---|
| deionised water | 20-35% by weight |
| butyl glycol | 4-7% by weight |
| pigment | 0.1-0.2% by weight |
| titanium dioxide | 2-3% by weight |
| ammonia 28% | 0.1-0.6% by weight |
| acrylic resin (cured copolymers in aqueous emulsion) | 4-8% by weight |
| Teflon ® (in powder) | 9-16% by weight |
| Nonyl phenoxy-polyethoxy sulphate (in aqueous emulsion) | 40-70% by weight |
| ammonium benzoate | 0.5-0.9% by weight |

The quantities expressed in % by weight in the present invention refer to the total weight of the formulation.

The self-locking formulation contains dimethacrylate in a quantity of between 30 and 60% by weight. A part of the dimethacrylate can be substituted with diurethane dimethacrylate and in this case the self-locking formulation preferably contains the dimethacrylate in a quantity of between 15 and 30% by weight, while the diurethane dimethacrylate is used in a quantity of between 15 and 30% by weight.

The self-locking formulation furthermore contains 5 to 9% by weight of an acrylic resin, 2 to 4% by weight of an initiator and 0.3 to 1.5% by weight of an accelerator. Both the initiator and the accelerator are used in microencapsulated form.

The following is an example of a self-locking formulation according to the present invention:

| | |
|---|---|
| deionised water | 40-60% by weight |
| ammonium benzoate | 0.5-2% by weight |
| ammonium phosphate | 0.05-0.2% by weight |
| titanium dioxide | 1-2% by weight |
| ammonia 28% | 0.3-0.7% by weight |
| dimethacrylate (bisphenol A ethoxylate dimethacrylate) | 19-27% by weight |
| diurethane dimethacrylate | 18-28% by weight |
| acrylic resin (cured copolymers in aqueous emulsion) | 5-9% by weight |
| pigment | 0.3-0.9% by weight |
| talc | 0.4-1% by weight |
| benzoyl peroxide | 2-4% by weight |
| microencapsulated ferrocene | 0.4-1.4% by weight |

The quantities expressed in % by weight refer to the total weight of the formulation.

According to a preferred embodiment of the present invention, the pH of the sealing and self-locking formulations is maintained in the range of 5 to 10, and more preferably 6 to 8.

The pH can be adjusted by incorporating in the formulations of the present invention an effective quantity of an organic or inorganic base, which does not interfere with the polymerization of the acrylic resin and the dimethacrylate. Preferably, the pH is adjusted by the addition of $NH_4OH$ or NaOH to obtain a good curing characteristic of the sealing and self-locking formulations.

The acrylic resin that can be used in the formulations of the present invention is an aqueous emulsion of cured copolymers selected from ACRYSOL™ ASE, 20, 60 and 75 and preferably ACRYSOL™ ASE 60.

The dimethacrylate that can be used in the self-locking formulation according to the present invention is bisphenol A ethoxylate dimethacrylate.

The sealing formulation of the present invention does not contain catalyst, therefore the bolt fixing action is not as strong as the self-locking formulation, which incorporates polymerization initiator and accelerator.

The sealing formulation uses an acrylic resin in combination with phenoxy polyethoxy sulphate, the presence of which had a surprising effect on the performance of the reaction product. The introduction of phenoxy polyethoxy sulphate into the sealing formulation according to the invention gives the reaction product considerable resistance and stability to chemical agents, at the same time also improving its sealing power.

Furthermore, surprisingly, the sealant thus formulated does not require pre-treatment with primer on the metal and plastic surface before its application. Said pre-treatment is essential to allow anchoring of the other products of the known art on the parts it is applied to.

The self-locking formulation of the present invention contains a polymerization initiator and accelerator in a microencapsulated form, which are activated when the nut is tightened on the screw previously treated with the self-locking formulation. The polymerization and curing are triggered in anaerobic conditions and the chemical reaction immediately produces the blocking effect between the nut and the screw.

Unlike the known art, the self-locking formulation according to the present invention does not contain polymerization inhibitors that produce shorter polymer chains, because they inactivate not only the primary and secondary radicals but also those responsible for growth of the polymer. The short chains, formed due to the action of the polymerization inhibitors, produce a lesser "gluing" effect and, therefore, an inferior bolt blocking force. Furthermore the absence of inhibitors means that polymerization of the product deposited on the screw occurs before the bolt has been tightened. This phenomenon of "prepolymerization" negatively affects the blocking capacity of the reaction product. To avoid said drawback, the self-locking formulation of the present invention is characterised on the one hand by the absence of polymerization inhibitors and on the other contains a microencapsulated polymerization accelerator. The ferrocene is preferably used as a polymerization accelerator according to the present invention.

Furthermore, surprisingly, the blocking formulation composed in this way does not require pre-treatment with primer on the surfaces prior to its application, whereas said pre-treatment is essential to allow anchoring of the other products of the known art on the parts on which it is applied to.

The ferrocene is coated by means of an innovative method by a film of protective material which prevents its reaction with the polymerization initiator before the bolt has been tightened. When the bolt is tightened, according to the invention, the protective film breaks as a result of the friction, thus providing the ferrocene for the polymerization.

The method used to coat the polymerization accelerator according to the invention comprises the following steps: preparing an aqueous gelatin solution, adjusting the pH of the aqueous solution to a value between 4 and 7, introducing an accelerator into the aqueous gelatin solution, adding a hardening agent of the film that coats the accelerator and an anticaking material, separating the solid part from the aqueous part, washing the solid part with water and drying the end product.

Advantageously the polymerization accelerator is ferrocene, the hardening agent is glutaric aldehyde and the anticaking material is silica ($SiO_2$).

The use of a microencapsulated polymerization accelerator in the formulation of the present invention avoids the use of polymerization stabilisers and inhibitors entailing the negative effects described above and allows conservation of the product for a prolonged period without altering its blocking characteristics.

BRIEF DESCRIPTION OF THE DRAWINGS

Further characteristics and advantages of the present invention will become clear from the following description, provided as a non-limiting example, with reference to the accompanying figures, in which.

DESCRIPTION OF THE PREFERRED EMBODIMENTS

The sealing formulation was then tested for resistance to oil by submerging the treated screws in two different types of vehicle engine lubricant oil: Multicor and TormaProt.

The preparation method of the sealing formulation and the results of the oil resistance and detachment force test are given below in the examples, which are described here solely by way of non-limiting example of the present invention.

EXAMPLE 1

The following compounds are added in a turbo-mixer under stirring: 30 g of deionised water, 4 g of butyl glycol, 0.1 g of pigment Unisperse® blue ID 30466565 and 0.2 g of aqueous solution of ammonia 28% to obtain a mixture with pH 6.5. The compounds are mixed at a speed of 1400 rpm and then 2 g of titanium dioxide, 0.7 g of ammonium benzoate and 4 g of acrylic resin ACRYSOL™ ASE 60 are added to the mixture under stilling. The mixture obtained is placed in a vacuum at 0.6 bars and stirring is maintained for 5 minutes. The mixture is then brought to atmospheric pressure and 16 g of Teflon® are added under stirring while 60 g of phenoxy-polyethoxy sulphate are added. The mixture obtained is maintained under stirring for 25 minutes at 0.8 bars.

In order to obtain an end product with optimal characteristics, such as viscosity and sealing property, the reaction times and pressures must be maintained as in the example.

Figure 1:
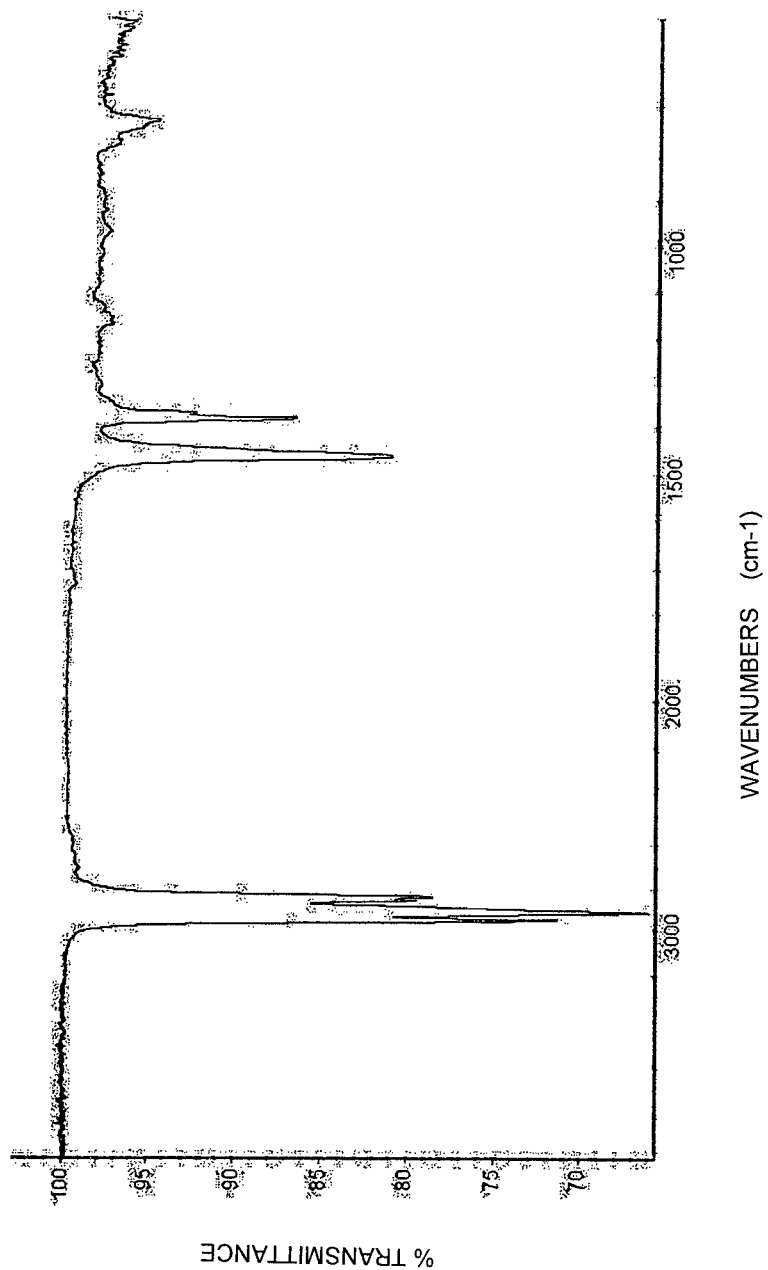
FIG. 1 is an IR spectrum of the product Multicor (vehicle engine lubricant oil)
Figure 2:
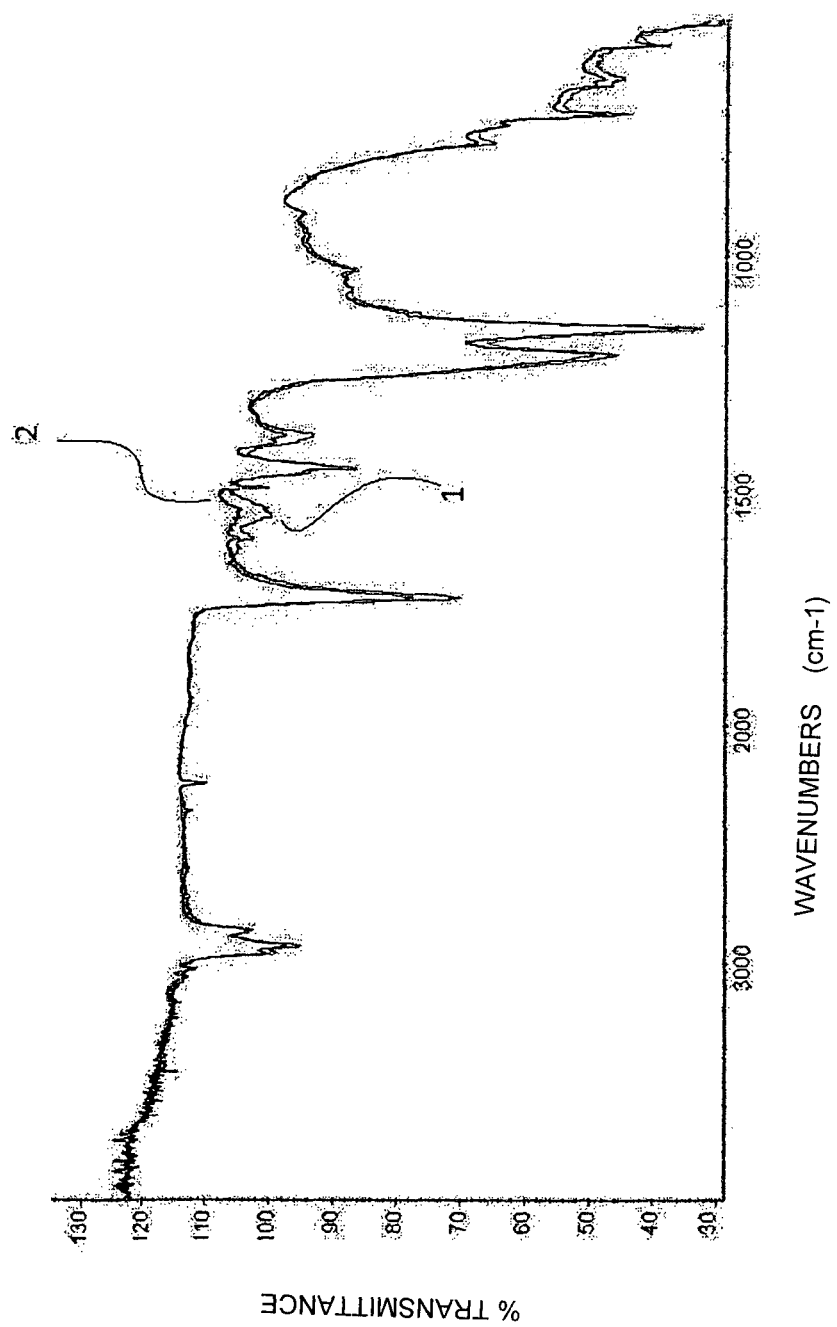
FIG. 2 shows two overlapped IR spectra of the screws immersed in the oil and not immersed in the oil, treated with the sealing formulation according to the present invention.

The product obtained in this example undergoes an oil resistance test after immersion of the screws having surfaces treated with the product of the Example 1. The IR spectrum of the Multicor product (vehicle engine lubricant oil) is recorded and the IR spectrum shown in FIG. 1 is obtained. The outer surfaces of the screws are treated with the product obtained according to Example 1 and the screws are immersed in the Multicor product. The IR spectra recorded are shown in comparison in FIG. 2, which highlights the overlapping of the two IR spectra of the surfaces of the immersed 1 and not immersed 2 screws in the oil. To conclude, it was found that the two IR spectra in FIG. 2 do not show relevant differences and only some absorption bands of the sample immersed in the oil show a slight increase, which can be attributed to migration to the surface of the benzoate present in the sealing product. No new absorption bands are present, and therefore no chemical modifications occurred in the sealing product following immersion in oil of the treated screw with the product of Example 1.

The same test was repeated with another type of vehicle engine lubricant oil, sold under the name Torma Prot.

Figure 3:
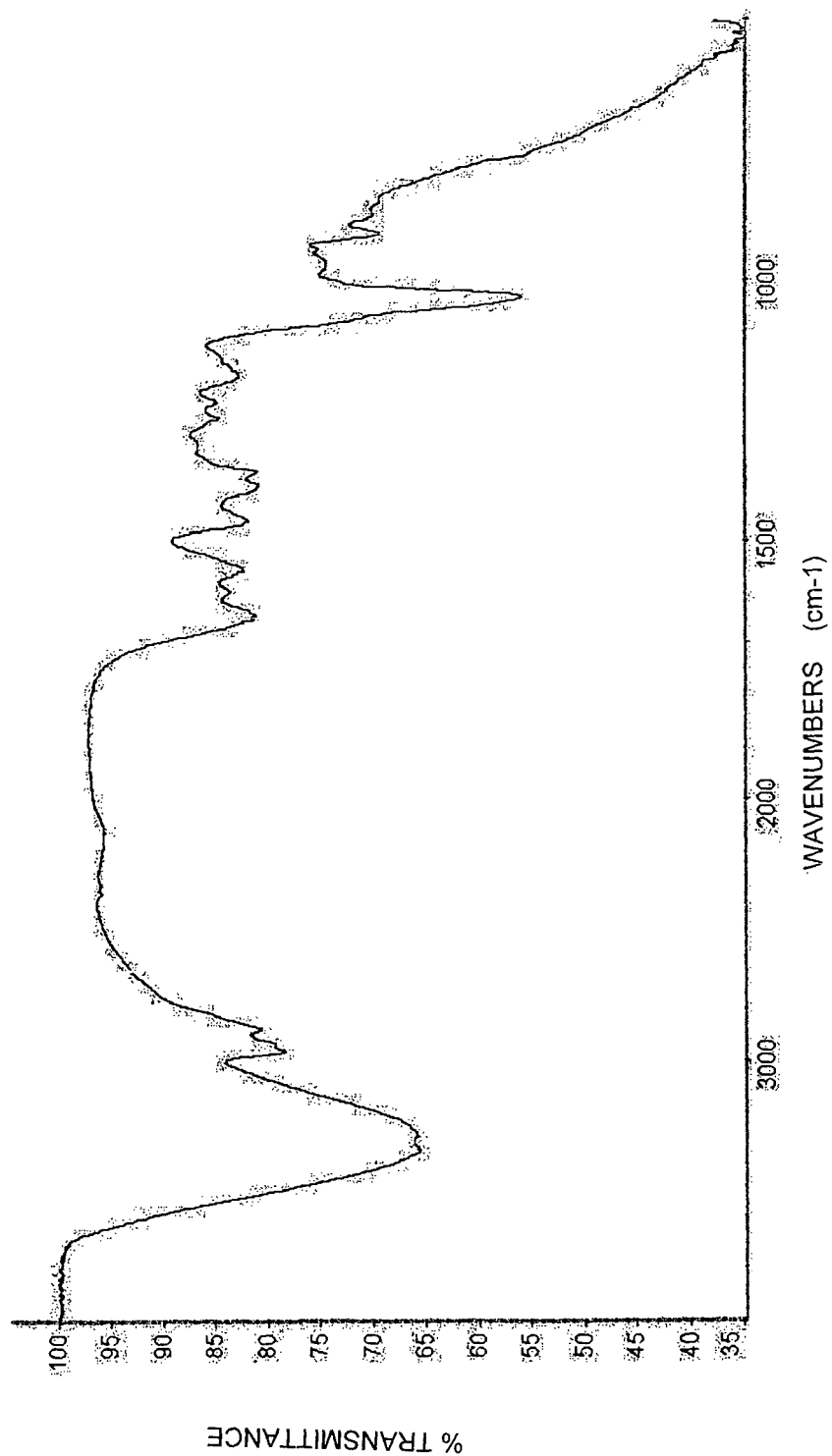
FIG. 3 is an IR spectrum of the product Torma Prot (vehicle engine lubricant oil)
Figure 4:
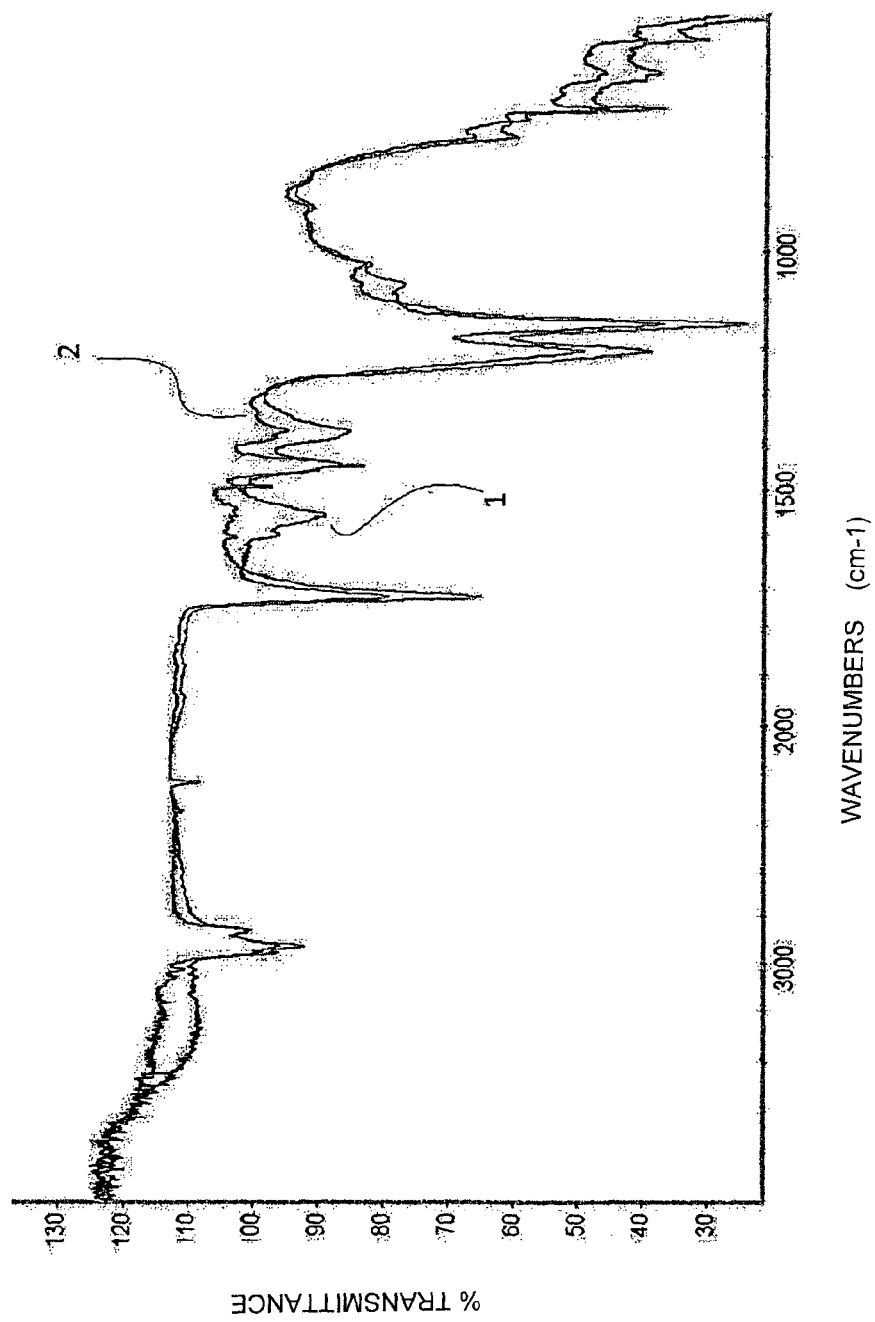
FIG. 4 shows two overlapped IR spectra of the screws immersed in the oil and not immersed in the oil, treated with the sealing formulation according to the present invention.

The IR spectrum of the Torma Prot oil is shown in FIG. 3, while FIG. 4 shows the IR spectra of the outer surfaces of the screws immersed in the oil 1 and not immersed in the oil 2 treated with the sealing product of Example 1. The IR spectra of the surfaces of the immersed and not immersed screws do not show relevant differences. A slight increase is noted in some absorption bands of the sample immersed in the oil, attributable to migration to the surface of the benzoate present in the sealant. No new absorption bands are present, hence no chemical modifications have taken place in the sealing product following immersion in the Torma Prot oil.

EXAMPLE 2

55 g of deionised water are placed in the turbo-mixer and under stirring the following are added: 0.6 g of pigment UNISPERSE® RED ID 1996500, 0.4 g of an aqueous solution of ammonia 28%, 2 g of titanium dioxide, 0.8 g of talc, 1 g of ammonium benzoate, 0.1 g of ammonium phosphate, 6 g of acrylic resin ACRYSOL™ ASE 60 and 18 g of bisphenol A ethoxylate dimethacrylate. The of the mixture is 6.5. The temperature of the mixture obtained is brought to ambient temperature and the mixture is placed in a vacuum at 0.6 bars and kept under stirring for 5 minutes in a vacuum. The pressure of the mixture is then brought to atmospheric pressure and 21 g of bisphenol A ethoxylate dimethacrylate are added. The obtained mixture is placed in a vacuum at 0.8 bars and kept under stirring for 20 minutes.

3 g of microencapsulated benzoyl peroxide and 0.9 g of microencapsulated ferrocene are added to the product thus obtained and the mixture is stirred for 5 minutes.

The benzoyl peroxide initiator is microencapsulated according to the method known in the prior art, while the ferrocene accelerator is encapsulated via the following method.

80 g of deionised water are added in the mixer, and 0.2 g of sodium hexametaphosphate and 4 g of gelatin are introduced under stirring. When introduction of the gelatin is complete, the stirring is maintained for a few minutes and the mixture is left to rest for 30 minutes. Under stirring, the temperature of the mixture is brought to 45-70° C. and the sodium hydroxide is added, the mixture is cooled to 43° C., 0.2 g of acetic acid are added and, at the end, 15 g of ferrocene. The temperature of the mixture is cooled at ambient temperature. The temperature of the product obtained is then rapidly cooled to 10-18° C. and 2 g of glutaric aldehyde and 1 g of silica ($SiO_2$) are added.

The product obtained is settled, then the aqueous solution is washed and the solid part is washed with deionised water. This operation is repeated three times. The product obtained is then filtered and placed in a dryer at 40° C. for 48 hours. The end product is microencapsulated ferrocene.

Surprisingly, the product thus formulated has much higher detachment values than the products in use and the values are very uniform. The detachment values measured on an M10 screw according to the DIN 267/27 standard are given in the following Table 1.

TABLE 1

| Test No | 1 | 2 | 3 | 4 | 5 | 6 | 7 | 8 | 9 | 10 | Mean value |
|---|---|---|---|---|---|---|---|---|---|---|---|
| Detachment after 48 hours (Nm) | 30.10 | 27.47 | 31.96 | 31.79 | 31.70 | 30.27 | 26.59 | 29.95 | 29.00 | 28.68 | 29.71 |

EXAMPLE 3

55 g of deionised water are placed in the turbo-mixer and then under stirring the following are added: 0.6 g of pigment UNISPERSE® GREEN ID 30267548, 0.4 g of an aqueous solution of ammonia 28%, 1 g of titanium dioxide, 1 g of ammonium benzoate, 0.1 g of ammonium phosphate and 7 g of ACRYSOL™ ASE 60 (used as acrylic resin). The temperature of the mixture obtained is brought to ambient temperature and the mixture is placed under a vacuum at 0.6 bars. Stirring of the mixture is maintained under a vacuum for 5 minutes. The mixture is brought to atmospheric pressure and 25 g of bisphenol A ethoxylate dimethacrylate are added. It is placed under a vacuum at 0.8 bars and kept under stirring for 20 minutes.

2 g of microencapsulated benzoyl peroxide and 0.4 g of microencapsulated ferrocene are added to the product thus obtained. The mixture is stirred for 5 minutes.

Surprisingly, the product thus formulated presents very uniform detachment values. The values measured on an M10 screw according to the DIN 267/27 standard are given in the following Table 2.

TABLE 2

| Test No | 1 | 2 | 3 | 4 | 5 | 6 | 7 | 8 | 9 | 10 | Mean value |
|---|---|---|---|---|---|---|---|---|---|---|---|
| Detachment after 48 hours (Nm) | 16.80 | 16.15 | 17.00 | 16.31 | 15.60 | 16.30 | 16.21 | 15.50 | 15.31 | 16.75 | 16.19 |

The invention claimed is:

1. An anaerobic curing formulation comprising an aqueous emulsion of:
   a) at least one acrylic resin and
   b) phenoxy-polyethoxy sulphate.

2. The formulation according to claim 1, wherein the acrylic resin is an aqueous emulsion of cured copolymers.

3. Formulation according to claim 1 wherein the phenoxy-polyethoxy sulphate is an aqueous mixture containing nonylphenoxy polyethoxy branched ammonium sulphate and an aqueous solution of ammonia.

4. An anaerobic curing formulation comprising an aqueous emulsion of
   a) 30-60% by weight of at least one dimethacrylate;
   b) 5-9% by weight of at least one acrylic resin;
   c) 2-4% by weight of a microencapsulated polymerization initiator; and
   d) 0.3-1.5% by weight of a microencapsulated polymerization accelerator.

5. Formulation according to claim 4, wherein it comprises a diurethane dimethacrylate.

6. Formulation according to claim 4 wherein the acrylic resin is an aqueous emulsion of cured copolymers.

7. Formulation according to claim 4, wherein the dimethacrylate is bisphenol A ethoxylate dimethacrylate.

8. Formulation according to claim 4, wherein the polymerization accelerator is microencapsulated ferrocene.

9. Formulation according to claim 1 wherein the pH is adjusted in a range between 5 and 10 with an inorganic base selected from the group consisting of $NH_4OH$ and $NaOH$.

10. Method for microencapsulating a polymerization accelerator, comprising preparing an aqueous gelatin solution, adjusting the pH of the aqueous solution to a value between 4 and 7, introducing a polymerization accelerator into the aqueous gelatin solution, adding an agent to harden the gelatin and an anticaking material, separating the solid part from the aqueous part, washing the solid part with water and drying the end product.

11. Method according to claim 10, wherein the polymerization accelerator is ferrocene, the hardening agent is glutaric aldehyde and the anticaking material is silica.

12. A method for sealing or blocking screws, nuts, bolts, screw caps or sealing caps comprising applying the formulation of claim 1 to the threads of the screws, nuts, bolts, screw caps or sealing caps.

13. A method for sealing or blocking screws, nuts, bolts, screw caps or sealing caps comprising applying the formulation of claim 4 to the threads of the screws, nuts, bolts, screw caps or sealing caps.

14. A method of claim 13 wherein the surfaces of the threads of screws, bolts and screw caps and sealing caps are not pre-treated with a primer.

15. An anaerobic formulation comprising an aqueous emulsion of
   a) at least one dimethacrylate;
   b) at least one acrylic resin;
   c) a microencapsulated polymerization initiator; and
   d) a microencapsulated polymerization accelerator,
wherein the microencapsulated polymerization accelerator is prepared by the method of claim 10.

16. An anaerobic curing formulation comprising an aqueous emulsion containing
   a) at least one dimethacrylate;
   b) at least one acrylic resin;
   c) a microencapsulated polymerization initiator; and
   d) a microencapsulated polymerization accelerator,
wherein the microencapsulated polymerization accelerator includes a coating comprising gelatin, glutaric aldehyde, and silica.

* * * * *